United States Patent
Li

[19]

[11] Patent Number: 6,115,933
[45] Date of Patent: Sep. 12, 2000

[54] TAPE MEASURE WITH DECELERATING MECHANISM

[76] Inventor: Shih-Lin Li, 3rd Floor, No.22, Lane 81, Tun-Hwa South Road, Section 2, Taipei, Taiwan

[21] Appl. No.: 08/802,941

[22] Filed: Feb. 21, 1997

[51] Int. Cl.[7] .................................................. G01B 3/10
[52] U.S. Cl. ........................................ 33/767; 242/396.7
[58] Field of Search ............................... 33/767; 242/396, 242/396.5, 396.7, 396.8, 381, 381.1, 381.3, 381.6, 385.4

[56] References Cited

U.S. PATENT DOCUMENTS

| | | | |
|---|---|---|---|
| 2,575,354 | 11/1951 | Mills | 33/767 |
| 4,153,996 | 5/1979 | Rutty. | |
| 5,007,178 | 4/1991 | Dewire et al. | 33/767 |
| 5,395,069 | 3/1995 | Chen | 33/767 |
| 5,400,521 | 3/1995 | Waldherr | 33/767 |
| 5,531,395 | 7/1996 | Hsu | 33/767 |
| 5,657,551 | 8/1997 | Lin | 33/767 |

FOREIGN PATENT DOCUMENTS 882640  11/1961  United Kingdom ..................... 33/767

*Primary Examiner*—Thomas B. Will
*Attorney, Agent, or Firm*—Dougherty & Troxell

[57] ABSTRACT

A coilable tape blade is disposed in a housing with a distal end having a hook projecting from an aperture. A positive locking mechanism is mounted on a frontal peripheral side of the housing and is operable for applying a positive lock on the tape blade when the tape blade has been extended from the housing. A measurement of a work piece can be determined when the tape blade is locked in an extended position. A decelerating mechanism is mounted on the bottom of the tape measure. The decelerating mechanism comprises a lever, a spring and an anvil. When the positive locking mechanism is released, the decelerating mechanism can be used to control the speed at which the tape blade is retracted into the housing, thereby preventing damage to the distal end of the tape blade and the hook. The deceleration of the automatic retraction of the tape blade into the housing is accomplished by pressing the lever at its pressure point. The lever has two extensions that engage the tape blade with the anvil, and temporarily stops the retraction of the tape blade. The whole tape measure fits comfortably within the user's grip. The user's thumb is positioned on the push button of the positive locking mechanism and the user's fingers are positioned on the lever.

12 Claims, 6 Drawing Sheets

TAPE MEASURE WITH DECELERATING MECHANISM

TECHNICAL FIELD

The present invention relates to coilable tape measures, and particularly to a coilable tape measure provided with a decelerating mechanism used to control the speed at which the tape blade is retracted into the housing and a positive locking mechanism.

BACKGROUND OF THE INVENTION

Coilable tape measures are widely employed to facilitate measurement and to effect the return of an extended tape blade into a housing for storage and carrying purposes. The tape blade is constructed of metal, and an element is secured to its outer surface end, which is referred to as a hook. The hook aids in the use of the tape blade. The hook is a bent metal strip secured to the tape blade by rivets. The tape blade is spring-loaded to be biased toward a retracted position within the housing. When the tape blade is completely retracted and coiled within the housing, the hook remains outside the housing. There is a positive locking mechanism that allows the tape blade to be locked in place when the tape blade is extended for convenience in making measurements. The locking mechanism usually operates on the tape blade within the housing and an actuator, e.g., a push button, is located on a peripheral surface so that it can be easily manipulated by the thumb as the tape measurer is grasped by the user. The actuator can be pressed on or off by the user. Usually the lock is actuated when the tape blade is extended and correctly positioned within a given extended position and the lock is released when the user desires the tape blade to be automatically retracted and coiled within the housing.

A spring used to retract and coil the extended tape blade into the housing is quite powerful, particularly with respect to a tape blade extending a large distance from the housing. There is a tendency for the extended length of tape blade to flex or whip as it is being withdrawn into the housing as an aperture into the housing provides an effective pivot point. The hook can also provide a second point of pivoting or flexure for the extended tape with the metal tape bending about the inner end of the hook. This whipping and flexing of the hook as the tape blade is being retracted can cause fatigue at the inner end of the tape blade and the hook.

The retraction and coiling of the tape blade into the housing is stopped rather abruptly by the abutment of the hook against the wall of the housing about the aperture. There is a tendency for shock loading about the rivets or other means for fastening the hook to the tape blade to produce fatigue or shear. Thus, it is quite common for the tape blade to fracture or shear in the area of the hook, which, in turn, causes the tape blade to be retracted and coiled completely into the housing, thereby preventing further use of the measuring tape. In addition, if the tape blade is extended a large distance from the housing and is then retracted into the housing, the whipping or flexing of the hook can mar the surface of a work piece.

It is an object of the present inventions to provide a measuring tape with a decelerating mechanism that is used to control the speed at which an extended tape blade is retracted into a housing chamber and coiled.

It is also an object of the present invention to provide a measuring tape with a decelerating mechanism that is used to prevent fatigue, rupture, shear, or fracture to the outer end of the tape blade and hook on the tape blade upon retraction of an extended tape blade into the housing.

Another object of the present invention is to provide a decelerating mechanism that fits easily into the measuring tape housing.

It is a further object of the present invention to provide a decelerating mechanism that allows an extended tape blade to be stopped temporarily while being retracted into the housing through the aperture.

It is an even further object of the present invention to provide a decelerating mechanism and locking mechanism on two peripheral surfaces of the measuring tape.

Still yet another object of the present invention is to provide a decelerating mechanism on the bottom peripheral surface of the measuring tape for convenient griping and use by the user's fingers while an extended tape blade is being retracted and coiled into the housing through the aperture.

Still yet an even further object of the present invention is that the decelerating mechanism be large enough to accommodate a few fingers.

A still further object of the present invention is to provide a decelerating mechanism having no engagement with the tape blade when not in use.

A still yet even further object of the present invention is to provide a decelerating mechanism that does not destroy or scrape-off any of the graduation lines on the tape blade.

A still yet even further object of the present invention is to provide a decelerating mechanism that is easy to assemble within the tape measure.

SUMMARY OF THE INVENTION

This invention is directed to providing a novel tape measure device of the character described, one that solves the above and many other problems in a wide variety of trades and satisfies the need for a novel tape measure device having a decelerating mechanism and a positive locking mechanism.

In its broader aspects, the deceleration mechanism of the present invention is a tape measure which includes a housing that is provided with a chamber and has a peripheral wall with an opening. An elongated measuring tape blade is coiled within the housing chamber. The tape blade has two ends. The inner end of the tape blade is secured to a spool by a recoil spring, and the outer end of the tape blade extends through the opening in the housing. The tape blade has a hook secured to the outer end. The tape blade is extended beyond the housing by pulling on the hook and is retracted automatically into the housing when the hook is released.

In its broader aspects, the measuring tape additionally includes a locking means which is mounted on the peripheral wall of the measuring tape and which locks the tape blade in position while the tape blade is in an extended position outside of the housing. A decelerating means which controls the speed that the extended tape blade retracts into the housing, thereby preventing damage to the outer end of the tape blade and the hook, is mounted on the peripheral wall of the tape measure.

The various features and advantages of the invention will become more apparent from the detailed description of a preferred embodiment of the invention when considered along with the accompanying drawings.

BEST MODE FOR CARRYING OUT THE INVENTION

Figure 1:
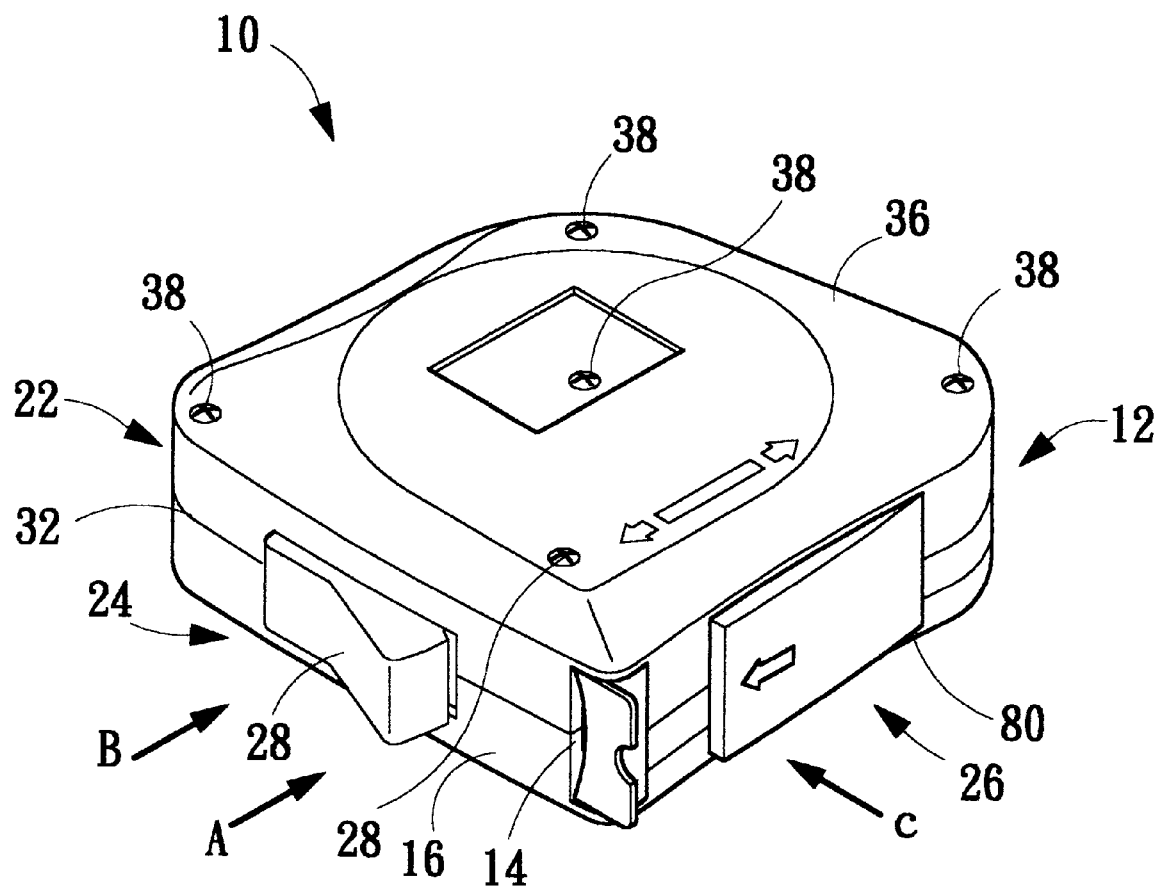
FIG. 1 is a perspective view of a measuring tape embodying the present invention.

Referring to the drawings in greater detail, and first to FIG. 1, the invention is incorporated in a tape measure device, generally designated 10, which includes a housing, generally designated 12 having an opening or aperture 14 on a peripheral side 16 through which a coilable tape blade 18 can be extended and retracted. Housing 12 is of a size and shape for easy grasping by the user around a bottom area 20 of the housing with the user's fingers and overlying a top/front area 22 of the housing 12 with the user's thumb.

Generally, the invention contemplates tape measure device 10 to include a locking mechanism 24 for applying a positive lock on the tape blade 18 and a decelerating mechanism 26 for controlling the speed at which the extended tape blade retracts into the housing 12. Details of the brake and decelerating mechanism will be described hereinafter. However, still referring to FIG. 1, a locking mechanism 24 includes a manual locking member or an actuator 28 in the form of a push button exposed exteriorly of the housing 12 in the sidewall 16 area thereof. Actuator lever 28 is depressed by the user's thumb in the direction of the arrow "A". The decelerating mechanism 26 includes a lever-type actuator 30 exposed exteriorly of the housing 12 in the bottom area 20 of the housing 12 for depressing by a user's fingers.

Housing 12 is formed as a split-type housing along a generally central parting line 32, as is known in the measuring tape art. This facilitates assembly of the device, as well as subsequent disassembly or repair purposes. The split housing forms a front housing half 34 and a rear housing half 36. The two halves of the housing are secured together by conventional screw fasteners 38, as is well known in the art. The screw fasteners 38 project through the rear housing half for threading into the internal bosses 40, shown in FIG. 2, in the front housing 34 by screwdriver type tools or the like. The housing can be made of plastic or metal or other similar material. Preferably, each of the housing halves is molded of plastic material, whereby various bosses, flanges, side rails and positioning means for various components and the like can be molded integrally on the interior of the housing without requiring countless separate parts.

Figure 2:
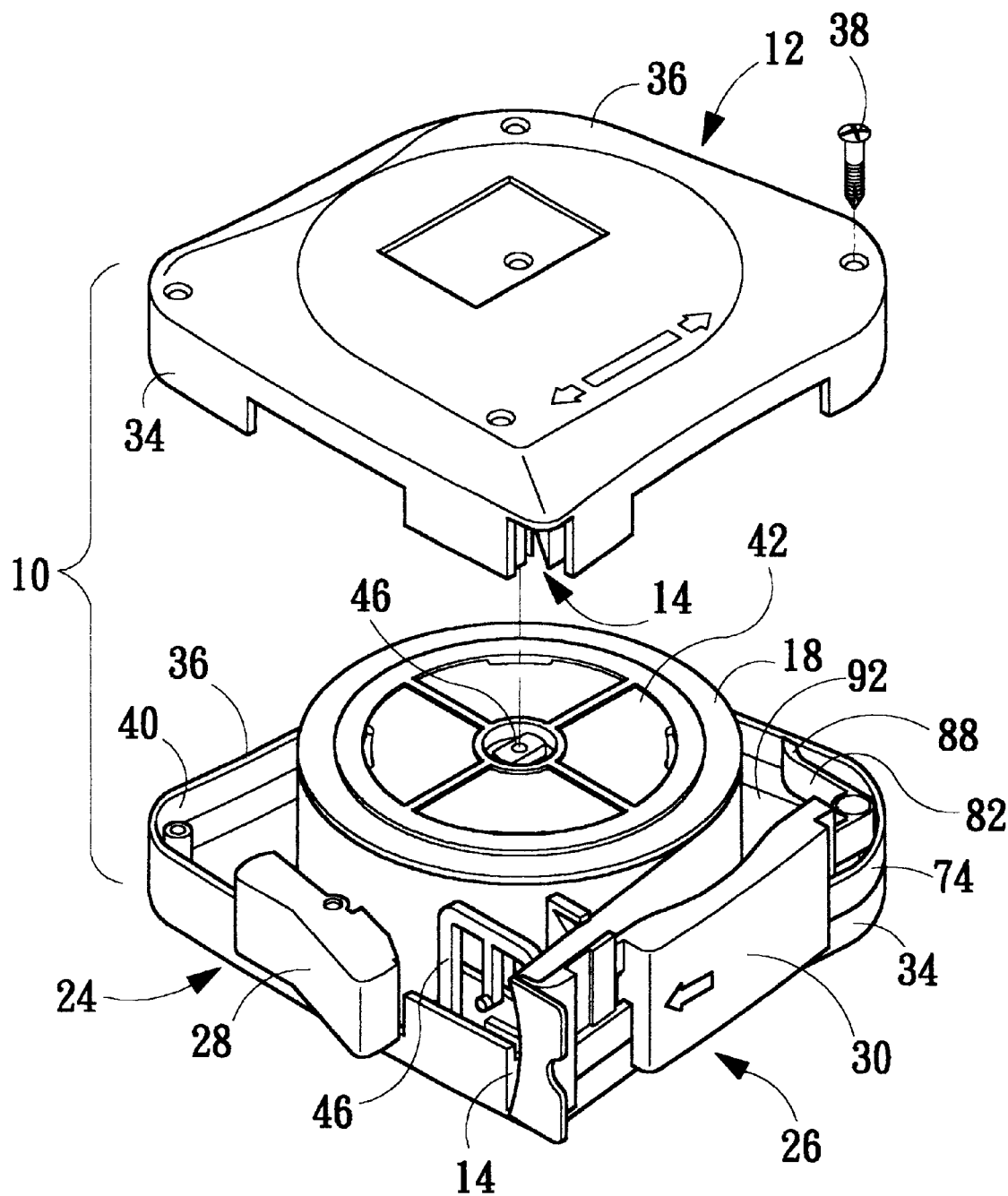
FIG. 2 is a perspective view of the measuring tape embodying the present invention showing both housing halves.

Referring to FIG. 2, the interior of front housing half 34 is shown and illustrates the interior components of the device, including the components of the positive locking mechanism and decelerating mechanism.

Tape blade 18, itself, is of conventional design and is concave to provide inherent stiffness. As has become convenient in manufacturing such devices, the tape blade 18 is wound on a spool package, generally designated as 42, which, for sufficient purposes herein, will be described only to the extent that such spool packages incorporate spring means, not shown, whereby the tape blade is spring loaded to be biased toward a retracted position within the housing chamber 44. The spool itself is positioned onto a cylindrical boss molded integrally with and projecting interiorly of front housing half 34. This type of automatically retractable, spring loaded coilable tape has been known in the industry for many years.

Still referring to FIG. 2, it is contemplated that tape measure device 10 includes a positive locking mechanism 24 for applying a positive lock on the tape blade 18 and a decelerating mechanism generally designated at 26 for controlling the speed at which an extended tape blade is retracted into the housing chamber 44. The positive locking mechanism is activated by pressing actuator 28, and the decelerating mechanism is activated by pressing lever 30.

Figure 3:
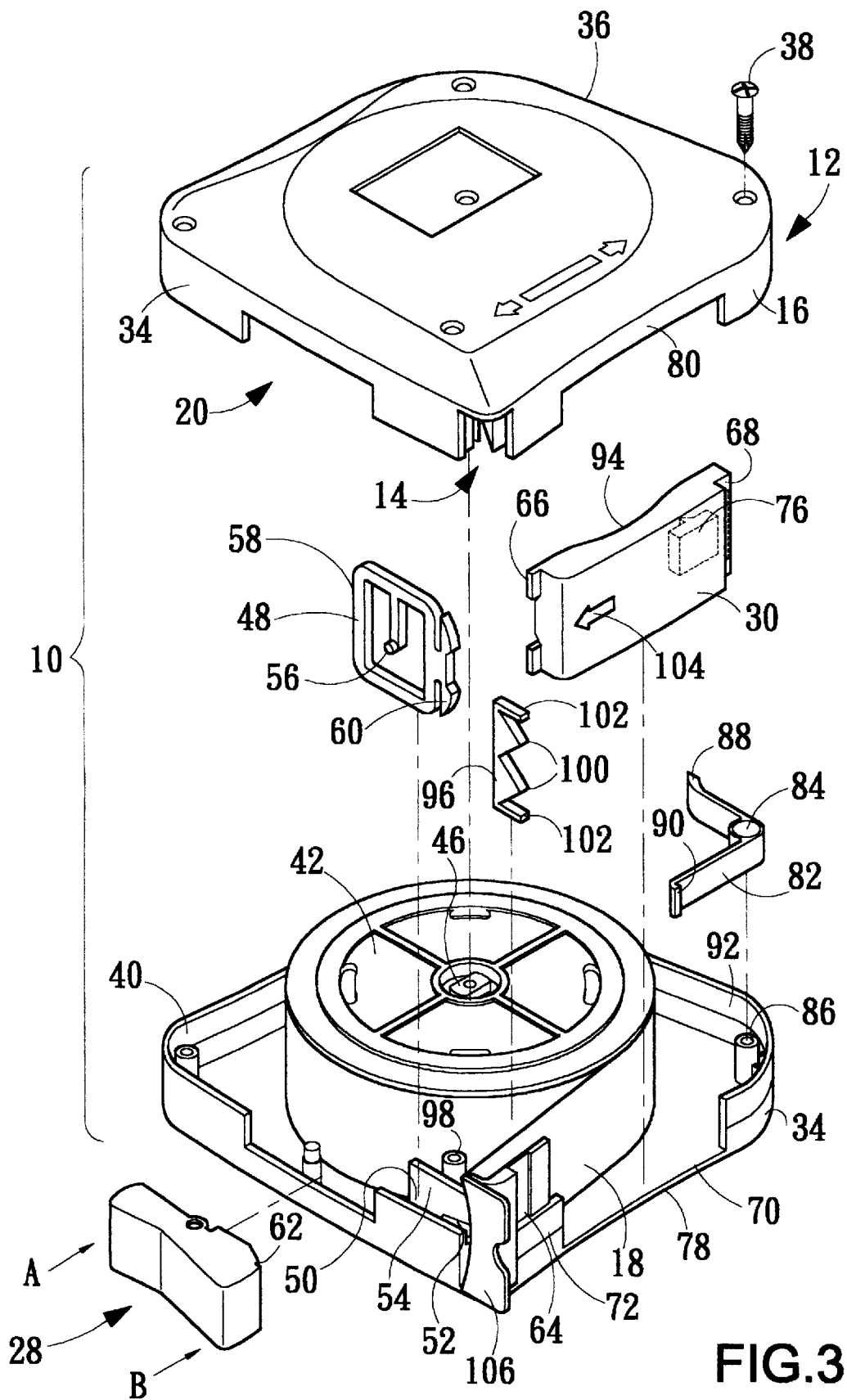
FIG. 3 is an exploded view of the measuring tape embodying the present invention.

FIG. 3 is an exploded view of the present invention; the locking mechanism 24, as stated above, is provided to be selectively operable for applying a positive lock on tape blade 18 to prevent the retraction of the tape blade. The locking mechanism provides a locking force greater in magnitude than that of the decelerating mechanism 26. In particular, a manual locking means, actuator or push-button 28, is moved inward in the direction of arrow "A" to apply a positive lock on the tape blade 18. The actuator 28 operates on an interior force applying member 48, which directly engages tape blade 18.

More specifically, force applying member 48 is positioned within a slot 50 defined by a first flange 52 and a second flange 54. Hook 56 projecting outwardly on force applying member 48 in a normal position does not touch the end of the first flange but instead rests behind it. One end 58 of the force applying member 48 has a flat structure and the other end 60 of force applying member 48 has a "T" shaped structure. The "T" end 60 does not touch the tape blade 18 in the normal position.

When it is desirable to apply a positive lock on tape blade 18, the actuator 28 is pressed down with the thumb in the direction of arrow "A", and an indent 62 on the actuator 28 contacts the end 58 of the force applying member and moves hook 56 to abut the end of the first flange. Force applying member 48 moves downward in slot 54 into engagement tape blade 18. Tape blade 18 is forced against back stop 64. The abutment of indent 60 with the end 58 of force applying member 48 and the abutment of the "T" of force applying member 48 with the tape blade 18 and the back stop 64 positively lock the tape blade 18 into position. In the locking position, the tape blade is positively locked in a given position for an accurate reading of the tape blade 18. Automatic retraction of the tape blade 18 is prevented.

When it is desired to release the positive lock applied by the locking mechanism, actuator 28 is pressed in a direction of "B", whereupon the end 58 of the force applying member 48 is released from the indent 62 of the actuator. The force applying member 48 moves upwardly in slot 50 and the "T" end of force applying member is release from contact with the tape blade 18. The positive lock on the tape blade 18 is now released.

Figure 4:
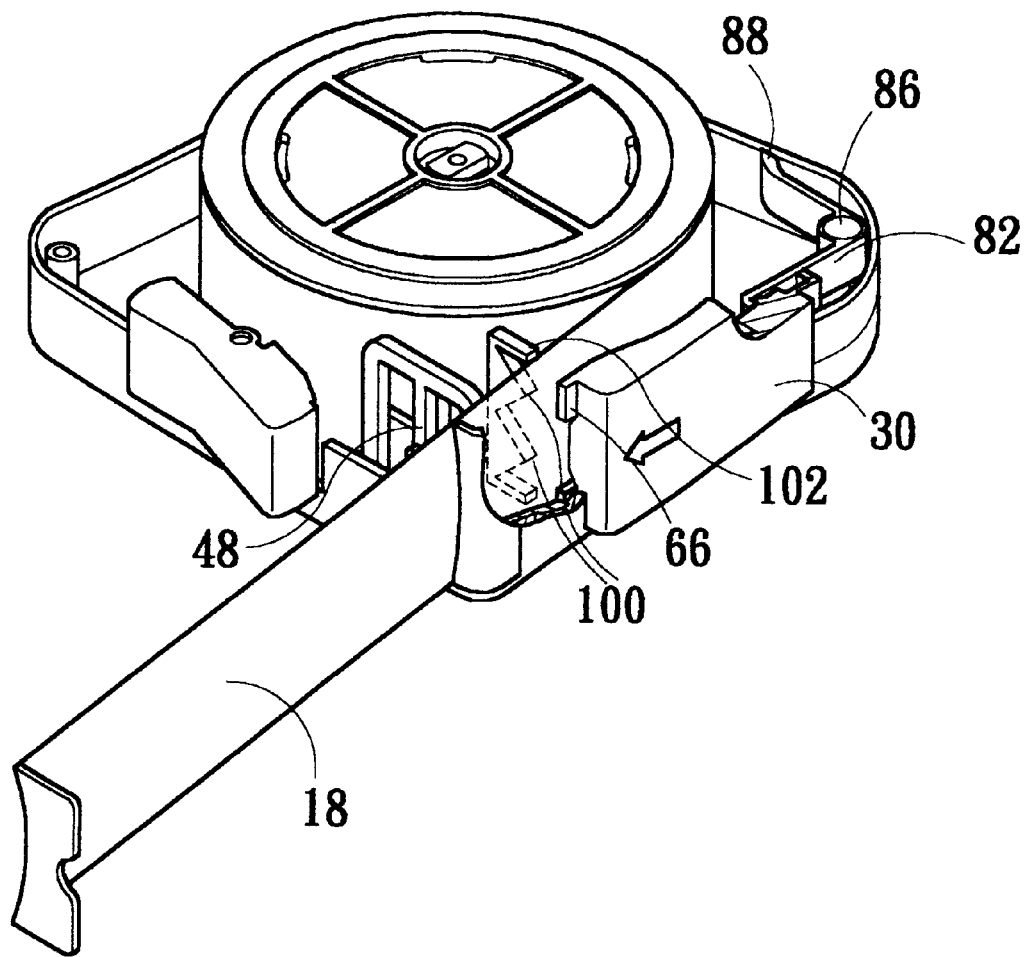
FIG. 4 is a perspective view of the measuring tape without one of the two housing halves embodying the present invention with the decelerating lever in a normal position.
Figure 5:
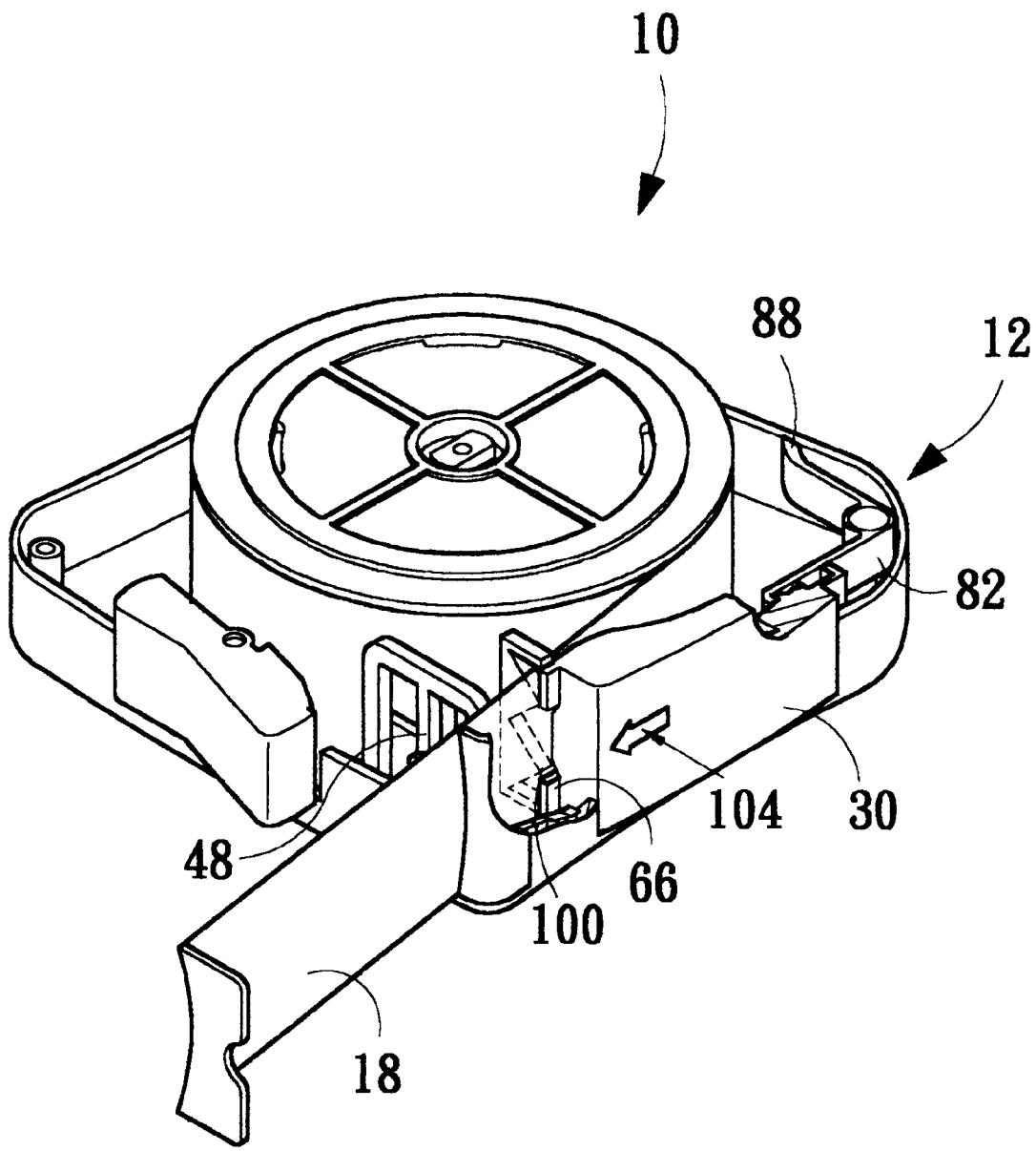
FIG. 5 is a perspective view of the measuring tape without one of the two housing halves embodying the present invention with the lever in a decelerating position.

The decelerating mechanism is shown as exploded view in FIG. 3. The decelerating mechanism is shown in a normal position in FIG. 4 and in an engagement position in FIG. 5. In FIG. 3, the decelerating lever 30 is shown with two projections 66 at one end and a flange 68 at the other end. In the bottom peripheral side of the housing, there is an opening for the lever 30. The lever 30 is positioned on the side wall 70 below with the two projections 66 behind sidewall 72, and the end flange 68 behind side wall 74. The lever has a stud shown in phantom as 76 on its underside. The bottom peripheral sidewalls 78 and 80 are slightly convex toward the center. When the lever 30 is positioned longitudinally across the opening in the bottom of the sidewall 70, it hangs slightly below the sidewalls 72 at the push end and is substantially flush with the sidewall 74 at the lever end. It is pushed in the direction of the arrow "C" as shown in FIG. 1. The convex portion of the sidewalls 78 and 80 is approximately the length of the lever.

The end flange 68 of the lever is positioned by a "V" shaped spring 82. The spring 82 has a cylinder 84 that fits over boss 86 of the front housing half 34. As shown in FIG. 2 one end of spring 82 has hook 88 that abuts against inside front housing at 92. The second hook 90 on spring 82 rests on stud 76. Lever 30 is concavely arcuate longitudinally on both sides at 94 so as not to engage the tape blade 18 in either the normal or decelerating position. The spring pushes the decelerating lever outwardly at its pressure point 104 in what is referred to as a normal position. The lever 30 is of sufficient length so that the pressure point 104 is sufficiently far from the supporting point.

As shown in FIG. 3, anvil 96 is attached to boss 98. The anvil 96 can also have a cylinder not shown that will fit over boss 98. Anvil 96 is irregular in shape and has two triangle projections 100 and two hooks 102. The tape blade 18 is concave and rests within the hooks 102 in a normal position. The triangle projections 100 of the anvil 96 are shaped so to avoid scratching off the imprinted numbers on the tape blade 18 when the anvil engages the tape blade during the decelerating process. The decelerating mechanism fits within the housing chamber without requiring an increase in size of the tape measure, i.e., it can be held within the user's grasp with the user's fingers positioned to press the decelerating lever when desired and the user's thumb contacting the positive lock push button. The housing, the positive locking mechanism, and the decelerating mechanism can each be manufactured of plastic, metal, or other suitable material, but preferably plastic. The tape blade, the hook, and the screws can be manufactured of metal, plastic or other suitable materials, but preferably metal.

Figure 6:
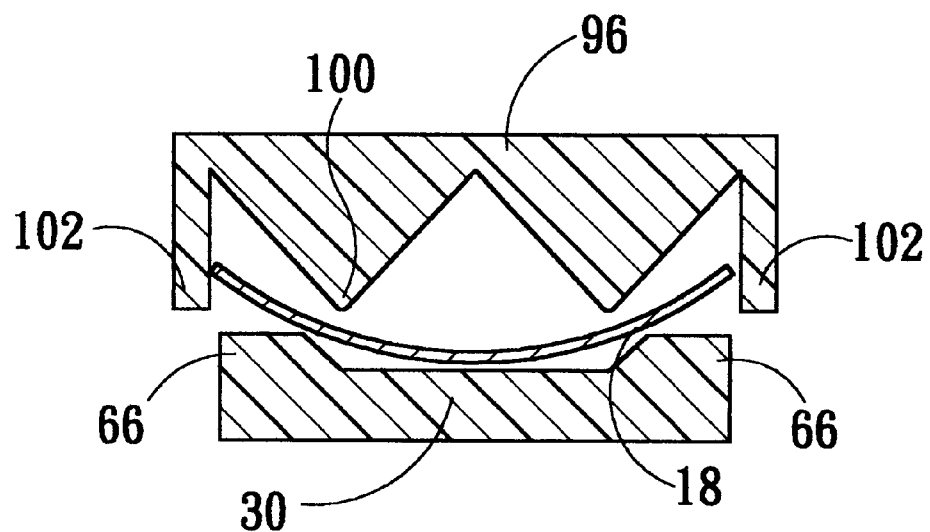
FIG. 6 is a vertical section taken along line 6—6 of FIG. 4.
Figure 7:
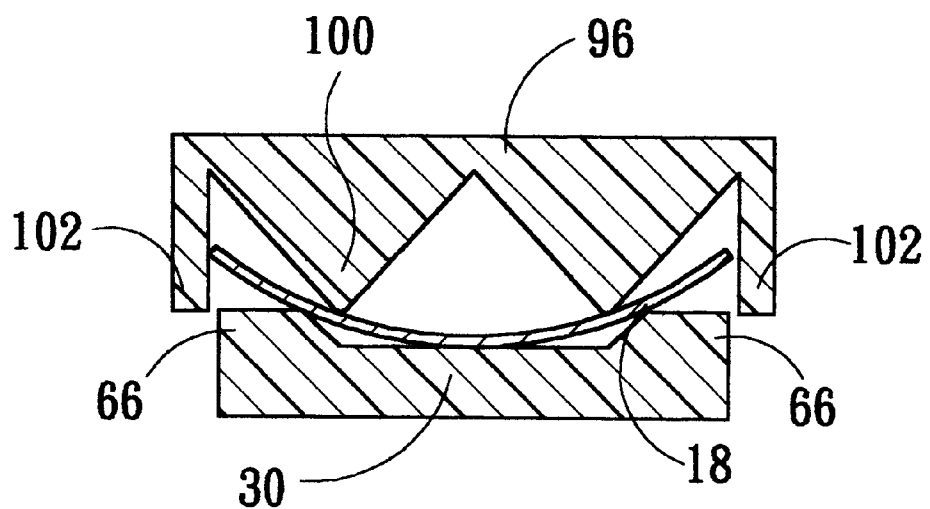
FIG. 7 is a vertical section taken along line 7—7 of FIG. 5.

In a normal position, as shown in FIG. 6, the concave tape blade 18 rests within the hooks 102 of the anvil 96, and the lever 30 is not in engagement or in contact with the tape blade 18. In the decelerating position, as shown in FIG. 7, the tape blade 18 is slightly distorted as the projections 66 of the lever 30 engages the tape blade 18 and forced against anvil 96 when pressure is applied to the lever at the arrow 104.

A user usually pulls on the hook 106 of the tape blade and extends the tape blade so as to mark a measurement. When the correct length of tape blade has been extended, the user will press the push button, and the tape blade will be positively locked in a position. This will prevent the tape blade 18 from automatically retracting into the housing chamber. After use, the push button is released, and the tape blade is rapidly drawn back under its recoil spring into the housing chamber and coiled. In order to slow this retraction or in order to control the speed of retraction of the tape blade, the decelerating lever is manually pressed into engagement with the tape blade and released and pressed and released until the tape blade is fully retracted into the housing chamber. The decelerating lever sufficiently controls the speed of retraction and cushions the shock of the impact of retraction upon the tape blade so that damage to the hook and end of the tape blade is prevented, thereby extending the useful life of the measuring tape.

The present invention has been described with a degree of particularity. It is the intent, however, that the invention include all modifications and alterations from the disclosed embodiments falling within the spirit or scope of the appended claims.

What is claimed is:

1. A tape measure comprising:
   a. a housing providing a chamber and having a peripheral wall with an opening;
   b. an elongated measuring tape blade coiled within said housing chamber, said tape blade having two ends, said inner end of said tape blade secured to a spool by a recoil spring and said outer end of said tape blade extending outwardly through said opening in said housing and having a hook secured to said outer end; said tape blade is extended beyond said housing by pulling on said hook and is retracted automatically into said housing when said hook is released;
   c. a locking means in mounted on said peripheral wall for locking said tape blade in position while said tape blade is in an extended position outside said housing; and
   d. a decelerating means is mounted on said peripheral wall for controlling the speed of retraction of said extended tape blade into said housing thereby preventing damage to said outer end of said tape blade and said hook, wherein said decelerating means comprising a lever having two extensions on a distal end of said lever, a spring, and an anvil, wherein said spring partially positions and secures a proximal end of said lever in said housing and allows said two extensions of said lever to be out of contact with said tape blade in a normal position, wherein when external manual pressure is applied to said lever said two extensions of said lever contact said tape blade with said anvil, thereby slowing the movement of said tape blade during its automatic retraction into said housing, and wherein said spring is plastic, V shaped, and is bent at each end to more positively secure the lever within said housing, said spring having an opening at the V intersection for positioning said spring on a boss whereby said spring is securely positioned in said housing, and wherein one end of said spring is positioned adjacent to said housing and the other end is adjacent to said lever.

2. The measuring tape according to claim 1, wherein said anvil is irregular in shape and further including at least one triangle-shaped extension for contacting said tape blade when pressure is applied to said lever; said extension is triangle shaped so as to avoid removal of any of the measuring lines and numbers from said tape blade during contact.

3. The measuring tape according to claim 1, wherein said lever is longer than said locking means and wherein said tape blade is slightly concave and loosely fits within end extensions of said anvil.

4. The measuring tape according to claim 1, wherein said lever is partially concave along the longitudinal axis of the lever whereby a longitudinal side of said level avoids any contact with said tape blade.

5. A measuring tape comprising:
   a. a housing providing a chamber and having a peripheral wall with an opening;
   b. an elongated measuring tape blade coiled within said housing chamber, said tape blade having two ends, said inner end of said tape blade secured to a spool by a recoil spring and said outer end of said tape blade extending outwardly through said opening in said housing and having a hook secured to said outer end; said tape blade is extended beyond said housing by pulling on said hook and is retracted automatically into said housing when said hook is released;

c. a locking means is mounted on said peripheral wall for locking said tape blade in position while said tape blade is in an extended position outside said housing; and d. a decelerating means is mounted on said peripheral wall for controlling the speed of retraction of said extended tape blade into said housing thereby preventing damage to said outer end of said tape blade and said hook; wherein said decelerating means comprises a lever having two extensions on a distal end of said lever and a flange on said proximal end of said lever, a spring, and an anvil, wherein said spring partially positions and secures a proximal end of said lever in said housing and allows said two extensions of said lever to be out of contact with said tape blade in a normal position, wherein when external manual pressure is applied to said lever said two extensions of said lever contact said tape blade with said anvil, thereby slowing the movement of said tape blade during its automatic retraction into said housing, wherein in said spring is plastic, V shaped, and is bent at each end to more positively secure the lever within said housing, said spring having an opening at the V intersection for positioning said spring on a boss whereby said spring is securely positioned in said housing and wherein one end of said spring is positioned adjacent to said housing and the other end is adjacent to said lever.

6. The measuring tape according to claim 5, wherein said anvil is irregular in shape and further including at least one triangle-shaped extension for contacting said tape blade when pressure is applied to said lever; said extension is triangle shaped so as to avoid removal of any of the measuring lines and numbers from said tape blade during contact.

7. The measuring tape according to claim 5, wherein said lever is longer than said locking means and wherein said tape blade is slightly concave and loosely fits within end extensions of said anvil.

8. The measuring tape according to claim 5, wherein said lever is partially concave along the longitudinal axis of the lever whereby a longitudinal side of said level avoids any contact with said tape blade.

9. A tape measure comprising:

a. a housing providing a chamber and having a peripheral wall with an opening;

b. an elongated measuring tape blade coiled within said housing chamber, said tape blade having two ends, said inner end of said tape blade secured to a spool by a recoil spring and said outer end of said tape blade extending outwardly through said opening in said housing and having a hook secured to said outer end; said tape blade is extended beyond said housing by pulling on said hook and retracted automatically into said housing when said hook is released; and c. a decelerating means is mounted on said peripheral wall for controlling the speed of retraction of said extended tape blade into said housing thereby preventing damage to said outer end of said tape blade and said hook, wherein said decelerating means comprising a lever having two extensions on a distal end of said lever, an anvil and a spring, wherein said spring partially positions and secures a proximal end of said lever in said housing and allows said two extensions of said lever to be out of contact with said tape blade in a normal position, wherein when external manual pressure is applied to said lever said two extensions of said lever contact said tape blade with said anvil, thereby slowing the movement of said tape blade during its automatic retraction into said housing, wherein said spring is plastic, V shaped and is bent at each end to more positively secure the lever within said housing, said spring having an opening at the V intersection for positioning said spring on a boss whereby said spring is securely positioned in said housing, and wherein one end of said spring is positioned adjacent to said housing and the other end is adjacent to said lever.

10. The measuring tape according to claim 9, wherein said anvil is irregular in shape and further including at least one triangle-shaped extension for contacting said tape blade when pressure is applied to said lever; said extension is triangle shaped so as to avoid removal of any of the measuring lines and numbers from said tape blade during contact.

11. The measuring tape according to claim 9, wherein said lever is longer than said locking means and wherein said tape blade is slightly concave and loosely fits within end extensions of said anvil.

12. The measuring tape according to claim 9, wherein said lever is partially concave along the longitudinal axis of the lever whereby a longitudinal side of said level avoids any contact with said tape blade.

* * * * *